(12) United States Patent
Hong et al.

(10) Patent No.: US 9,540,508 B2
(45) Date of Patent: Jan. 10, 2017

(54) THERMOPLASTIC RESIN COMPOSITION

(71) Applicant: Samsung SDI Co., Ltd., Yongin-si (KR)

(72) Inventors: Chang Min Hong, Uiwang-si (KR); Won Seon Lee, Uiwang-si (KR); Kee Hae Kwon, Uiwang-si (KR); Jeong Min Lee, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 24 days.

(21) Appl. No.: 14/583,939

(22) Filed: Dec. 29, 2014

(65) Prior Publication Data

US 2015/0183985 A1 Jul. 2, 2015

(30) Foreign Application Priority Data

Dec. 27, 2013 (KR) .................. 10-2013-0164840

(51) Int. Cl.
*C08K 9/10* (2006.01)
*C08L 69/00* (2006.01)
*C08L 83/10* (2006.01)
*C08G 77/448* (2006.01)

(52) U.S. Cl.
CPC ............ *C08L 69/00* (2013.01); *C08L 83/10* (2013.01); *C08G 77/448* (2013.01)

(58) Field of Classification Search
CPC ................................ C08G 64/06; C08K 3/40
USPC ........................................ 523/122; 524/504
See application file for complete search history.

(56) References Cited

U.S. PATENT DOCUMENTS

| 5,731,389 | A | 3/1998 | Bailly et al. | |
|---|---|---|---|---|
| 6,790,887 | B1 | 9/2004 | Nishihara | |
| 7,695,815 | B2 | 4/2010 | Agarwal et al. | |
| 7,888,409 | B2 | 2/2011 | Hayata et al. | |
| 8,907,013 | B2 | 12/2014 | Ha et al. | |
| 2002/0104461 | A1* | 8/2002 | Schmidt et al. | 106/417 |
| 2009/0274735 | A1* | 11/2009 | Wakamiya | 424/401 |
| 2013/0158161 | A1* | 6/2013 | Kim et al. | 523/122 |
| 2013/0172468 | A1 | 7/2013 | Kim et al. | |

FOREIGN PATENT DOCUMENTS

| KR | 10-1998-0066133 A | 10/1998 |
|---|---|---|
| KR | 10-2011-0126425 A | 11/2011 |
| KR | 10-2013-0015285 A | 2/2013 |
| KR | 10-2013-0062576 A | 6/2013 |
| KR | 10-2013-0078748 A | 7/2013 |

OTHER PUBLICATIONS

Office Action in counterpart Korean Application No. 10-2013-0164840 dated Jul. 4, 2016, pp. 1-5.

* cited by examiner

*Primary Examiner* — Hannah Pak
(74) *Attorney, Agent, or Firm* — Additon, Higgins & Pendleton, P.A.

(57) ABSTRACT

A thermoplastic resin composition includes a base resin comprising about 5 to about 95 weight % of polycarbonate resin and about 5 to about 95 weight % of polycarbonate-polysiloxane copolymer resin; and about 0.1 to about 5 parts by weight of luster pigment per about 100 parts by weight of the base resin.

8 Claims, No Drawings

THERMOPLASTIC RESIN COMPOSITION

CROSS REFERENCE TO RELATED APPLICATIONS

This application claims the benefit of priority under 35 U.S.C. §119(a) of Korean Patent Application No. 10-2013-0164840 filed on Dec. 27, 2013, in the Korean Intellectual Property Office, the entire disclosure of which is incorporated herein by reference for all purposes.

1. Field

The following description relates to a thermoplastic resin composition, and more particularly to a polycarbonate resin composition.

2. Background

Thermoplastic resin is advantageous for its low specific gravity, excellent processibility and impact resistance compared to glass or metal. Products made of plastic using thermoplastic resin are taking the place of glass and metal products at a rapid pace to meet the demand for less expensive, larger and lighter products. Furthermore, the area of application for thermoplastic resin is expanding from electric electronic products to automobile components.

Of various types of thermoplastic resins, polycarbonate (PC) resin, due to its excellent impact resistance, heat resistance, and rigidity, is widely used in electric/electronic products and automobile components.

Especially, in the case of interior and/or exterior materials of automobiles, various polycarbonate alloy resins have been used in order to complement the properties of polycarbonate resin such as excellent impact resistance, heat resistance, and rigidity with properties such low-temperature impact resistance and chemical resistance and so forth.

Of various types of polycarbonate alloys, PC/ABS (polycarbonate/acrylonitrile-butadiene-styrene copolymer) alloy resin is most widely used in interior and/or exterior materials of electric/electronic products and automobiles. See, for example, Korean Patent Publication No. 10-1998-0066133 and Korean Patent Publication No. 10-2013-0015285. PC/ABS alloy resin has many excellent advantages such as low temperature impact resistance and processibility besides room temperature impact resistance, heat resistance, and rigidity, but it also has limitations in coloring property, and insufficient light resistance to ultraviolet rays.

Generally, in order to complement the light resistance or chemical resistance in interior and/or exterior materials of automobiles, the surface of a component is painted or coated to prevent its discoloration or deformation from ultraviolet rays, chemicals, moisture and heat, so as to embody a sophisticated appearance and various colors. See for example Korean Patent Publication No. 10-2013-0062576.

However, a painting or coating process requires numerous steps, and has high defective rates and incidence rates of harmful volatile substances. Such a process also has restricted recyclability, and increases total costs.

Accordingly, following the recent environmentally friendly trend, there has been an increasing demand for uncoated materials, that is, materials that do not require a painting process.

SUMMARY

Therefore, the purpose of the present disclosure is to resolve the aforementioned problems of prior art, that is, to provide a thermoplastic resin composition that can have excellent impact resistance, fluidity, heat resistance, light resistance and/or chemical resistance, and that can embody the surface appearance of a product to have a sense of pearl or metal without a painting process.

In exemplary embodiments there is provided a thermoplastic resin composition including a base resin comprising about 5 to about 95 weight % of polycarbonate resin and about 5 to about 95 weight % of polycarbonate-polysiloxane copolymer resin; and about 0.1 to about 5 parts by weight of luster pigment per about 100 parts by weight of the base resin.

The luster pigment may include at least one of pearl particles coated with a pigment and/or dye and aluminum particles.

The luster pigment may have a plate form having an average diameter of about 1 to about 100 µm.

The color difference ($\Delta E$) of the thermoplastic resin composition may be or below about 2.0 when irradiated by 126 MJ/m$^2$ at a temperature of 89±3° C. and a relative humidity of 50±5% by the Xenon Arc test method according to SAE J 1885.

The gray scale of the thermoplastic resin composition may be or above grade 3 when irradiated by 126 MJ/m$^2$ at a temperature of 89±3° C. and a relative humidity of 50±5% by the Xenon Arc test method according to SAE J 1885.

The ratio of a length in a short direction to a length in a long direction of the luster pigment may be about 1:5 to about 1:100.

The pearl particles can be mica-based pearl particles, and the mica surface of the pearl particles may be coated with metal oxide. The ratio of the refractive index of the mica to the refractive index of the metal oxide may be about 1:1.5 to about 1:1.9.

The metal oxide may include titanium oxide, iron oxide, chromic oxide, silicon dioxide, aluminum oxide, tin oxide, zinc oxide, magnesium oxide, zirconium oxide, cerium oxide, lithium oxide, silver oxide, bismuth oxychloride, or a combination thereof.

The ratio of the weight of pearl particles to the weight of metal oxide may be about 1:0.05 to about 1:0.6.

The thermoplastic resin composition may have an impact strength of about 5 to about 30 kgf·cm/cm, a melt flow index (MFI) of about 5 to about 23 g/10 min, and a heat deflection temperature (HDT) of about 120 to about 150° C.

Other exemplary embodiments provide a molded product prepared from the aforementioned thermoplastic resin composition.

The molded product may be prepared as an uncoated product.

As aforementioned, by adding a luster pigment that includes pearl particles and/or aluminum particles into a polycarbonate resin composition, it is possible to provide a thermoplastic resin composition that is capable of embodying the surface appearance of a product to have a sense of pearl or metal even without a painting process.

Furthermore, by including a polycarbonate-polysiloxane copolymer resin in a polycarbonate resin, it is possible to provide a thermoplastic resin composition that can have excellent impact resistance, fluidity, heat resistance, light resistance, and/or chemical resistance.

The effects of the various embodiments of the present disclosure are not limited to the aforementioned effects, and effects not mentioned herein will be clearly understandable by those of ordinary skill in the art.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, the terms and words used herein and the claims should not be interpreted as limiting to a general or lexical meaning, but should be interpreted as having a meaning and concept that is suitable to the technical concept of the present disclosure for most suitably expressing the present disclosure.

Hereinbelow, a thermoplastic resin composition according to an embodiment of the present disclosure will be explained in detail.

A thermoplastic resin composition according to an embodiment of the present disclosure is a polycarbonate-based material having as base resin a material that includes a polycarbonate resin and polycarbonate-polysiloxane copolymer resin.

The thermoplastic resin composition may include a base resin having a polycarbonate resin and polycarbonate-polysiloxane copolymer resin, and a luster pigment.

Components of the thermoplastic resin composition according to an embodiment of the present disclosure will be explained in detail hereinbelow.

Base Resin

The base resin may include a polycarbonate resin and polycarbonate-polysiloxane copolymer resin.

The polycarbonate resin may be prepared by reacting a diphenol of Chemical Formula 1 below with phosgene, halogen acid ester, or carbonic acid ester, or with a combination thereof.

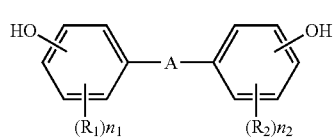

<Chemical Formula 1>

In the aforementioned Chemical Formula 1, A is a single bond, substituted or unsubstituted C1 to C30 linear chain or branched chain alkylene, substituted or unsubstituted C2 to C5 alkenylene, substituted or unsubstituted C2 to C5 alkylidene, substituted or unsubstituted C1 to C30 linear chain or branched chain haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear chain or branched chain alkoxylene, halogen acid ester group, carbonic acid ester group, CO, S or $SO_2$, $R_1$ and $R_2$ are the same or different and are each independently substituted or unsubstituted C1 to C30 or substituted or unsubstituted C6 to C30 aryl, and $n_1$ and $n_2$ are the same or different and are each independently an integer of 0 to 4.

Two or more diphenol groups of Chemical Formula 1 may be combined to form a repeating unit of a polycarbonate resin. Examples of such a diphenol group may include without limitation hydroquinone, resorcinol, 4,4'-dihydroxydiphenyl, 2,2-bis(4-hydroxyphenyl)propane (also called tisphenol-A'), 2,4-bis(4-hydroxyphenyl)-2-methylbuthane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3-methyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether and the like, and combinations thereof. In exemplary embodiments, 2,2-bis(4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-methyl-4-hydroxyphenyl)propane and/or 1,1-bis(4-hydroxyphenyl)cyclohexane may be used, for example, 2,2-bis(4-hydroxyphenyl)propane may be used.

The polycarbonate resin used herein may have, but is not limited to, a weight-average molecular weight of about 10,000 to about 200,000 g/mol, for example, about 15,000 to about 80,000 g/mol.

The polycarbonate resin may be a copolymer or a mixture of two or more copolymers prepared from two or more diphenol groups. Furthermore, the polycarbonate resin may be a linear polycarbonate resin, branched polycarbonate resin, and/or polyestercarbonate copolymer resin.

The linear polycarbonate resin may be a bisphenol-A type polycarbonate resin. The branched polycarbonate resin may be prepared by reacting a polyfunctional aromatic compound such as trimelitic anhydride or trimelitic acid with a diphenolic group and carbonate. The polyfunctional aromatic compound may be included in an amount of about 0.05 to about 2 mol % based on the total amount of the branched polycarbonate resin. The polyestercarbonate copolymer resin may be prepared by reacting di-functional carboxylic acid with a diphenol group and carbonate. The carbonate may be di-arylcarbonate such as diphenylcarbonate, or ethylene carbonate.

The MFI (melt flow index) of the polycarbonate resin may be about 3 to about 120 g/10 min under the measurement condition of about 310° C., about 1.2 kg.

The base resin may include the polycarbonate resin in an amount of about 5 to about 95 weight %, for example about 30 to about 90 weight %, and as another example about 60 to about 80 weight %, based on the total weight (100 weight %) of the base resin including the polycarbonate resin and the polycarbonate-polysiloxane copolymer resin. In some embodiments, the base resin may include the polycarbonate resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, 85, 86, 87, 88, 89, 90, 91, 92, 93, 94, or 95 weight %. Further, according to some embodiments of the present invention, the amount of the polycarbonate resin can be in a range from about any of the foregoing amounts to about any other of the foregoing amounts.

When the polycarbonate resin is included in an amount within the aforementioned ranges, the thermoplastic resin composition may have an excellent balance of impact resistance, heat resistance, and/or processibility.

The polycarbonate-polysiloxane copolymer resin includes a polycarbonate block and polysiloxane block.

The polycarbonate block includes a structural unit derived from the aforementioned polycarbonate resin.

The polysiloxane block includes a structural unit having Chemical Formula 2 shown below.

[Chemical Formula 2]

In Chemical Formula 2, $R^3$ and $R^4$ are the same or different and are each independently hydrogen, substituted or unsubstituted C1 to C20 alkyl, substituted or unsubstituted C2 to C20 alkenyl, substituted or unsubstituted C2 to C20 alkynyl, substituted or unsubstituted C1 to C20 alkoxy, substituted or unsubstituted C3 to C30 cycloalkyl, substituted or unsubstituted C3 to 30 cycloalkenyl, substituted or unsubstituted C3 to C30 cycloalkynyl, substituted or unsubstituted C6 to C30 aryl, substituted or unsubstituted C6 to C30 aryloxy, or NRR' (wherein R and R' are the same or different and are each independently hydrogen or substituted or unsubstituted C1 to C20 alkyl), and m is an integer satisfying 2≤m<10,000.

In the aforementioned Chemical Formula 2, m can be between 2 to 10,000, for example 2 to 1,000, in which case the impact resistance can be excellent and viscosity can be appropriate, and thus suitable for extrusion processing. In exemplary embodiments, m can be between 10 to 100, for example 25 to 80.

The polycarbonate-polysiloxane copolymer resin may include about 1 to about 99 weight % of polycarbonate block and about 1 to about 99 weight % of polysiloxane block, for example about 40 to about 95 weight % of polycarbonate block and about 5 to about 60 weight % of polysiloxane block, and as another example about 80 to about 95 weight % of polycarbonate block and about 5 to about 20 weight % of polysiloxane block.

In some embodiments, the polycarbonate-polysiloxane copolymer resin may include the polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, 85, 86, 87, 88, 89, 90, 91, 92, 93, 94, 95, 96, 97, 98, or 99 weight %. Further, according to some embodiments of the present invention, the amount of the polycarbonate block can be in a range from about any of the foregoing amounts to about any other of the foregoing amounts.

In some embodiments, the polycarbonate-polysiloxane copolymer resin may include the polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, 85, 86, 87, 88, 89, 90, 91, 92, 93, 94, 95, 96, 97, 98, or 99 weight %. Further, according to some embodiments of the present invention, the amount of the polysiloxane block can be in a range from about any of the foregoing amounts to about any other of the foregoing amounts.

A polycarbonate-polysiloxane copolymer resin including the polycarbonate block and the polysiloxane block in amounts within the aforementioned ranges can have excellent impact resistance.

The weight-average molecular weight of the polycarbonate-polysiloxane copolymer resin may be about 10,000 to about 30,000 g/mol, for example about 15,000 to about 22,000 g/mol. A polycarbonate-polysiloxane copolymer resin formed to have a weight-average molecular weight within the aforementioned ranges can have excellent impact resistance.

The polycarbonate-polysiloxane copolymer resin may reinforce the impact resistance of the polycarbonate resin composition.

The base resin may include the polycarbonate-polysiloxane copolymer resin in an amount of about 5 to about 95 weight %, for example about 10 to about 70 weight %, and as another example about 20 to about 40 weight %, based on the total weight (100 weight %) of the base resin including the polycarbonate resin and the polycarbonate-polysiloxane copolymer resin. In some embodiments, the base resin may include the polycarbonate-polysiloxane copolymer resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, 85, 86, 87, 88, 89, 90, 91, 92, 93, 94, or 95 weight %. Further, according to some embodiments of the present invention, the amount of the polycarbonate-polysiloxane copolymer resin can be in a range from about any of the foregoing amounts to about any other of the foregoing amounts.

When the polycarbonate-polysiloxane copolymer resin is included in an amount within the aforementioned ranges, the thermoplastic resin composition can have an excellent balance of impact resistance, heat resistance, and/or processibility.

Luster Pigment

A luster pigment is a material that provides a pearlescent and/or metallic appearance to a thermoplastic resin composition, thereby providing an excellent material capable of embodying a surface appearance to have a sense of pearl or metal.

The luster pigment may include pearl particles coated with a pigment and/or dye, or aluminum particles, or both.

The luster pigment can have a plate form, having an average diameter of about 1 to about 100 μm, for example about 10 to about 70 μm. The form of the luster pigment is generally amorphous, and herein the average diameter refers to the average value of the length of the luster pigment in a long direction. This average diameter may be obtained by measuring an enlarged image using a microscope and so forth.

The ratio of the length in a short direction to the length in a long direction of the luster pigment can be about 1:5 to about 1:100, for example about 1:10 to about 1:50.

In the case where the luster pigment has a plate form having an average diameter and ratio of the length in a long direction to the length in a short direction within the aforementioned ranges, due to the effects of the length in a long direction and the supporting reaction between the articles, when performing an injection molding of the thermoplastic resin composition including such a luster pigment, it is possible to restrict changes in the orientation of the luster pigment with respect to the velocity of a fluid, thereby providing a material that can have an excellent surface appearance having a sense of pearl or metal with minimal or no flow mark and/or weld line.

The pearl particles can be mica based pearl particles configured such that the mica surface is coated with metal oxide, wherein the mica may be natural mica or synthetic mica or both.

The refractive index of the metal oxide can be larger than the refractive index of the mica. In exemplary embodiments, the refractive index of the mica to the refractive index of the metal oxide can be about 1:1.5 to about 1:1.9, for example about 1:1.6 to about 1:1.8. Due to this difference of refractive index, the light reflected on a boundary of the metal oxide having a large refractive index and a mica having a small refractive index may effectively present a pearl luster.

Examples of the metal oxide may include without limitation titanium oxide, iron oxide, chromic oxide, silicon dioxide, aluminum oxide, tin oxide, zinc oxide, magnesium oxide, zirconium oxide, cerium oxide, lithium oxide, silver oxide, bismuth oxychloride, and the like, and combinations thereof. In exemplary embodiments, the metal oxide can include titanium oxide, iron oxide, and/or bismuth oxychloride.

The weight of the pearl particles to the weight of the metal oxide can be about 1:0.05 to about 1:0.6, for example about 1:0.3 to about 1:0.6.

By adjusting the coated contents of the metal oxide, it is possible to provide a sense of pearl from silver-like color to an interference color, and when the metal oxide is coated by the weight ratio within the aforementioned ranges with respect to the pearl articles weight, it is possible to obtain an interference color of high chroma, thereby embodying a surface of clear and smooth pearl luster.

By applying a pigment and/or dye to the surface of the pearl articles, it is possible to embody various colors. For example, it is possible to apply a pigment and/or dye of the same color as the interference color, or of a different color from the interference color to provide a two color effect.

The thermoplastic resin composition may include the luster pigment in an amount of about 0.1 to about 5 parts by weight per about 100 parts by weight of base resin, for example about 0.3 to about 3 parts by weight per about 100 parts by weight of base resin. In some embodiments, the thermoplastic resin composition may include the luster pigment in an amount of about 0.1, 0.2, 0.3, 0.4, 0.5, 0.6, 0.7, 0.8, 0.9, 1, 2, 3, 4, or 5 parts by weight. Further, according to some embodiments of the present invention, the amount of the luster pigment can be in a range from about any of the foregoing amounts to about any other of the foregoing amounts.

When the luster pigment is present in an amount less than about 0.1 parts by weight, it can be difficult to embody a surface appearance of sufficient sense of pearl or metal. When the luster pigment exceeds about 5 parts by weight, the light resistance and chemical resistance can decrease significantly, which can limit applications for the thermoplastic resin composition.

The thermoplastic resin composition according to an embodiment of the present disclosure may further include one or more additives according to its purpose of use.

Examples of the additive may include, but are not limited to, a dye, pigment, filler, UV stabilizer, lubricant, antimicrobial, release agent, nucleating agent, anti-static agent, and/or antioxidant. It is possible to use only one of the aforementioned additives or use a mixture of two thereof combined.

The aforementioned thermoplastic resin composition uses a polycarbonate-polysiloxane copolymer resin instead of rubber that is vulnerable to ultraviolet rays as a impact modifier, thereby not only providing excellent impact resistance but also excellent light resistance. Furthermore, the refractive index of the polycarbonate-polysiloxane copolymer resin is not too different from the refractive index of polycarbonate resin, and thus the polycarbonate-polysiloxane copolymer resin can have excellent coloring property compared to rubber type impact modifiers.

Accordingly, when the thermoplastic resin composition according to an embodiment of the present disclosure is irradiated by 126 MJ/m$^2$ at a temperature of 89±3° C. and an RH (Relative Humidity) of 50±5% in the Xenon Arc test method according to SAE J 1885, the color difference ($\Delta$E) may be or below about 2.0, for example may be or below about 1.5.

Furthermore, when the thermoplastic resin composition according to an embodiment of the present disclosure is irradiated by 126 MJ/m$^2$ in the aforementioned test method and under the aforementioned conditions, the gray scale may be or above grade 3. A composition having the aforementioned color difference and gray scale can have excellent light resistance and chemical resistance.

Furthermore, the Izod impact strength of the thermoplastic resin composition according to an embodiment of the present disclosure may be about 5 to about 30 kgf·cm/cm when a ¼" thickness notched Izod specimen is measured in accordance with ASTM D256.

The MFI (melt flow index) of the thermoplastic resin composition according to an embodiment of the present disclosure may be about 5 to about 23 g/10 min when measured under the condition of 250° C. and 10 kg in accordance with ASTM D1238.

The HDT (heat deflection temperature) of thermoplastic resin composition according to an embodiment of the present disclosure may be about 120 to about 150° C. when measured under the load of 18.56 kgf in accordance with ASTM D648.

The thermoplastic resin composition according to an embodiment of the present disclosure measured can have excellent impact resistance, fluidity, heat resistance, light resistance and/or chemical resistance even when a luster pigment including pearl and/or aluminum particles is added.

The thermoplastic resin composition according to an embodiment of the present disclosure may be prepared by a well known method for preparing a resin composition. For example, a thermoplastic resin composition according to an embodiment of the present disclosure may be prepared in a pellet form by mixing the substances of the present disclosure with other additives simultaneously and melting and extruding the mixture in an extruder.

The aforementioned thermoplastic resin composition uses a luster pigment to embody a surface appearance as if it is painted, wherein the properties that could have been deteriorated are complemented by polycarbonate-polysiloxane copolymer, so that it can desirably be applied to molded products that require impact resistance, fluidity, heat resistance, chemical resistance, and light resistance at the same time.

The thermoplastic resin composition according to an embodiment of the present disclosure may be applied to any type of molded product that requires the aforementioned characteristics, but it may desirably be applied to molded products for automobiles. Examples of molded products for automobiles include, but are not limited to, interior materials such as center fascia, interior garnish, and indicator panel, exterior materials such as outside mirror housing and garnish, lamp housing or bezel.

Using the thermoplastic resin of the present disclosure, the molded products may be prepared without an additional surface processing such as painting.

Examples

Hereinbelow, the test results for proving the excellent effects of a thermoplastic resin composition of the present disclosure will be explained.

The substances used in the thermoplastic resin composition of the embodiments and comparative examples are as follows.

Base Resin (a) Polycarbonate Resin

Bisphenol-A type linear polycarbonate resin having an MFI (melt flow index) of about 6 g/10 min (310° C., 1.2 kg) is used.

(b-1) RC-1700 which is the polycarbonate-polysiloxane copolymer resin product of Idemitsu Kosan Co., Ltd. is used.

(b-2) A rubber modified graft copolymerized resin wherein styrene and acrylonitrile are graft copolymerized to a polybutadiene rubber core prepared in a general emulsion polymerization to form a shell is used, the content of polybutadiene being about 58 weight %, and the average diameter being about 270 nm.

(b-3) A styrene-acrylonitrile copolymer resin having an average molecular weight of about 150,000 g/mol, prepared by copolymerizing about 75 weight % of styrene and about 25 weight % of acrylonitrile in a general suspension polymerization method is used.

Luster Pigment (c-1) Pearl particles having an average diameter of about 20 μm are used. These pearl particles have mica surfaces coated with a metal oxide, and per 100 parts by weight of pearl particles, the metal oxide is about 30 to about 50 weight % parts by weight.

(c-2) Aluminum particles having a plate form with an average diameter of about 40 μm are used.

(c-3) Pearl particles having an average diameter of 150 μm are used. The mica surface of the pearl particles is coated with metal oxide, and the amount of the metal oxide is about 5 to about 20 weight % per 100 weight % of pearl particles.

(c-4) Aluminum particles having a plate form with an average diameter of about 110 to about 150 μm are used.

Pigment (d-1) In order to embody white color, the RCL-69 product which is a titanium dioxide product of Millenium Inorganic Chemical Co., Ltd. is used.

(d-2) In order to embody black color, the Hi-black 50L which is a carbon black product of Korea Carbon Black Co., Ltd. is used.

The thermoplastic resin compositions of the embodiments and comparative examples herein are prepared using the amounts of substances shown in Table 1 below.

The substances shown in Table 1 are added and then dry-mixed, and then input into a twin-screw extruder of which the L/D ratio is 29, Φ is 45 mm, and the barrel temperature is set to 260° C. Then, using this extruder, a thermoplastic resin composition having a pellet form is prepared. The prepared pellet is dried at about 80° C. for 2 hours, and using a 60 oz injection molding machine of which the cylinder temperature is set to 260° C. and the mold temperature is set to 60° C., a specimen for evaluating properties and a specimen for evaluating surface appearance having the size of 90 mm (L)×50 mm (W)×2.0 mm (t) is prepared.

The unit of amounts of resins a and b (b-1, b-2, or b-3) of the base resin shown in Table 1 is weight % based on 100 weight % of the base resin including a and b (b-1, b-2 or b-3), and the unit of amounts of the luster pigment and dye are parts by weight based on 100 parts by weight of the base resin.

TABLE 1

| Substance | | Embodiments | | | | | | Comparative examples | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Base resin | (a) | 90 | 75 | 60 | 90 | 75 | 60 | 100 | 90 | 75 | 75 | 100 | 90 | 75 | 75 |
| | (b-1) | 10 | 25 | 40 | 10 | 25 | 40 | — | — | — | 25 | — | — | — | 25 |
| | (b-2) | — | — | — | — | — | — | — | 10 | 10 | — | — | 10 | 10 | — |
| | (b-3) | — | — | — | — | — | — | — | — | 15 | — | — | — | 15 | — |
| Luster pigment | (c-1) | 2 | 2 | 2 | — | — | — | 2 | 2 | 2 | — | — | — | — | — |
| | (c-2) | — | — | — | 0.5 | 0.5 | 0.5 | — | — | — | — | 0.5 | 0.5 | 0.5 | — |
| | (c-3) | — | — | — | — | — | — | — | — | — | 2 | — | — | — | — |
| | (c-4) | — | — | — | — | — | — | — | — | — | — | — | — | — | 0.5 |
| Pigment | (d-1) | 5 | 5 | 5 | — | — | — | 5 | 5 | 5 | 5 | — | — | — | — |
| | (d-2) | — | — | — | 1 | 1 | 1 | — | — | — | — | 1 | 1 | — | 1 |

The surface appearance, impact resistance, fluidity, heat resistance, light resistance, and chemical resistance of the thermoplastic resin compositions according to embodiments 1 to 6, and comparative examples 1 to 8 are evaluated. The evaluation method of the evaluation items is as follows. The evaluation results are shown in Table 2 below.

<Surface Appearance Test>

Specimens for evaluating surface appearance prepared using the thermoplastic resin compositions according to embodiments 1 to 6 and comparative examples 1 to 8 are evaluated with the naked eye. P (Pass) is given to specimens with excellent sense of pearl or metal, whereas N (NG) is given to specimens having poor sense of pearl or metal due to too big or too small luster pigment particles.

<Impact Resistance Test>

Notches are formed on specimens for measuring the Izod impact strength of the thermoplastic resin compositions of embodiments 1 to 6 and comparative examples 1 to 8 and the Izod impact resistance is measured in accordance with ASTM D256.

<Fluidity Test>

The MFI (melt flow index) of the thermoplastic resin composition pellets of embodiments 1 to 6 and comparative examples 1 to 8 is measured under the condition of 250° C. and 10 kg in accordance with ASTM D1238.

<Heat Resistance Test>

The HDT (heat deflection temperature) of specimens prepared using the thermoplastic resin compositions of embodiments 1 to 6 and comparative examples 1 to 8 is measured under the load of 18.56 kgf in accordance with ASTM D648.

<Light Resistance Test>

The color difference (ΔE) of specimens prepared using the thermoplastic resin compositions of embodiments 1 to 6 and comparative examples 1 to 8 is measured after irradiating by 126 MJ/m$^2$ at a temperature of 89±3° C. and a relative humidity of 50±5% in the Xenon Arc test method in accordance with SAE J 1885.

<Chemical Resistance Test>

Gasoline, engine oil, ethanol, glass cleaning agent, and grease are applied to the surface of specimens prepared using the thermoplastic resin compositions of embodiments 1 to 6 and comparative examples 1 to 8 in accordance with the evaluation method Hyundai Motor's MS210-05-B-1 and MS652-14. When there is no discoloration, fading, swelling, cracking or deterioration of luster at room temperature, and when the gray scale is grade 3 or above when measured after irradiating by 126 MJ/m$^2$ at a temperature of 89±3° C. and a relative humidity of 50±5% by the Xenon Arc test method regulated in the SAE 1885, P (Pass) is given, but if not, N (NG) is given.

TABLE 2

| evaluation items | Embodiments | | | | | | Comparative examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Surface appearance | P | P | P | P | P | P | P | P | P | N | P | P | P | N |
| Izod impact strength (kgf•m/cm) | 10 | 12 | 15 | 10 | 12 | 14 | 8 | 25 | 18 | 10 | 9 | 24 | 19 | 12 |
| MFI (g/10 min) | 7 | 10 | 12 | 12 | 15 | 18 | 6 | 4 | 25 | 9 | 15 | 12 | 27 | 14 |
| HDT (° C.) | 125 | 125 | 125 | 125 | 125 | 125 | 125 | 115 | 110 | 125 | 125 | 115 | 110 | 124 |
| Light resistance | 1.4 | 1.5 | 1.5 | 1.0 | 1.1 | 1.1 | 1.4 | 2.7 | 3.0 | 1.7 | 1.0 | 2.1 | 2.2 | 1.2 |
| Chemical resistance | P | P | P | P | P | P | N | N | N | N | N | N | N | N |

It can be seen from Tables 1 and 2 above that the specimens of molded products prepared using the thermoplastic resin compositions of embodiments 1 to 6 all have excellent surface appearance, impact resistance, fluidity, heat resistance, light resistance and chemical resistance.

It can also be seen that in embodiments 3 to 6, as the amount of polycarbonate-polysiloxane copolymer resin increases to a certain level, most of the properties improved compared to embodiments 1, 2, 4 and 5.

In the case of comparative examples of 1 to 6 where rubber modified graft copolymer resins or vinyl copolymer resins are used instead of polycarbonate-polysiloxane copolymer resin as base resin, most of the properties deteriorated, especially the light resistance and chemical resistance are weak compared to the embodiments.

Furthermore, in the case of comparative examples 4 to 8 where luster pigments have an average diameter outside the range of the present disclosure, it is difficult to embody a surface appearance having a sense of pearl or metal, which shows that the average diameter of a luster pigment is an important factor in embodying a surface appearance having a sense of pearl or metal. That is, when using the luster pigments within the range of the present disclosure, it is possible to use the thermoplastic resin compositions in uncoated materials.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition comprising:
a base resin comprising about 60 to about 90 weight % of polycarbonate resin and about 40 to about 10 weight % of polycarbonate-polysiloxane copolymer resin, each based on 100 weight of the base resin; and
about 0.5 to about 2 parts by weight of luster pigment per about 100 parts by weight of the base resin,
wherein the color difference (ΔE) of the thermoplastic resin composition is or below about 2.0 when irradiated by 126 MJ/m$^2$ at a temperature of 89±3° C. and a relative humidity of 50±5% by the Xenon Arc test method according to SAE J 1885,
wherein the luster pigment comprises mica pearl particles coated with metal oxide, aluminum particles having a plate form and an average diameter of about 1 μm to about 100 μm, or a combination thereof,
wherein the ratio of a length in a short direction to a length in a long direction of the luster pigment is about 1:5 to about 1:100, and
wherein the ratio of the refractive index of the mica to the refractive index of the metal oxide is about 1:1.5 to about 1:1.9 and the ratio of the weight of pearl particles to the weight of metal oxide is about 1:0.05 to about 1:0.6.

2. The composition according to claim 1, wherein the gray scale of the thermoplastic resin composition is or above grade 3 when irradiated by 126 MJ/m$^2$ at a temperature of 89±3° C. and a relative humidity of 50±5% by the Xenon Arc test method according to SAE J 1885.

3. The composition according to claim 1, wherein the metal oxide comprises titanium oxide, iron oxide, chromic oxide, silicon dioxide, aluminum oxide, tin oxide, zinc oxide, magnesium oxide, zirconium oxide, cerium oxide, lithium oxide, silver oxide, bismuth oxychloride, or a combination thereof.

4. The composition according to claim 1, wherein the thermoplastic resin composition also has an Izod impact strength of about 5 to about 30 kgf·cm/cm and a melt flow index (MFI) of about 5 to about 23 g/10 min.

5. A molded product prepared from the thermoplastic resin composition according to claim 1.

6. The molded product according to claim 5, wherein the gray scale of the thermoplastic resin composition is or above grade 3 when irradiated by 126 MJ/m$^2$ at a temperature of 89±3° C. and a relative humidity of 50±5% by the Xenon Arc test method according to SAE J 1885.

7. The molded product according to claim 5, wherein the molded product is an uncoated product.

8. The composition according to claim 1, comprising:
   a base resin comprising about 75 to about 90 weight % of polycarbonate resin and about 25 to about 10 weight % of polycarbonate-polysiloxane copolymer resin; and
   about 0.5 to about 2 parts by weight of luster pigment per about 100 parts by weight of the base resin.

* * * * *